United States Patent
Cain

(10) Patent No.: US 7,577,958 B1
(45) Date of Patent: Aug. 18, 2009

(54) EXPEDITING AN OPERATION IN A COMPUTER SYSTEM

(75) Inventor: Bradley Cain, Cambridge, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 0 days.

(21) Appl. No.: 09/458,190

(22) Filed: Dec. 9, 1999

(51) Int. Cl.
*G06F 9/46* (2006.01)
*G06F 9/44* (2006.01)

(52) U.S. Cl. .................. 718/103; 718/100; 718/102; 719/313

(58) Field of Classification Search ............. 709/200, 709/225, 100, 103, 104, 240, 226; 710/200, 710/260, 264; 370/397, 254, 217, 229, 219, 370/276; 718/100, 103, 102, 1; 719/310, 719/313
See application file for complete search history.

(56) References Cited

U.S. PATENT DOCUMENTS

| | | | | |
|---|---|---|---|---|
| 4,103,330 A | * | 7/1978 | Thacker ..................... | 718/103 |
| 4,320,451 A | * | 3/1982 | Bachman et al. ............ | 718/106 |
| 4,484,962 A | * | 11/1984 | Dienes et al. ................ | 156/49 |
| 4,823,256 A | * | 4/1989 | Bishop et al. ................ | 714/10 |
| 5,060,140 A | * | 10/1991 | Brown et al. ................ | 710/105 |
| 5,168,566 A | * | 12/1992 | Kuki et al. ................... | 718/103 |
| 5,193,189 A | * | 3/1993 | Flood et al. ................. | 718/103 |
| 5,247,677 A | * | 9/1993 | Welland et al. ............ | 718/103 |
| 5,249,269 A | * | 9/1993 | Nakao et al. ................ | 709/225 |
| 5,339,425 A | * | 8/1994 | Vanderah et al. ........... | 718/102 |
| 5,404,544 A | * | 4/1995 | Crayford ..................... | 713/310 |
| 5,428,789 A | * | 6/1995 | Waldron, III ................ | 718/103 |
| 5,432,525 A | * | 7/1995 | Maruo et al. ................. | 345/2.2 |
| 5,438,677 A | * | 8/1995 | Adams et al. ............... | 710/263 |
| 5,469,571 A | * | 11/1995 | Bunnell ...................... | 709/103 |
| 5,473,599 A | * | 12/1995 | Li et al. ....................... | 370/219 |
| 5,555,420 A | * | 9/1996 | Sarangdhar et al. ......... | 710/266 |
| 5,612,950 A | * | 3/1997 | Young ......................... | 370/276 |
| 5,630,128 A | * | 5/1997 | Farrell et al. ................. | 718/103 |
| 5,828,568 A | * | 10/1998 | Sunakawa et al. ............. | 700/79 |
| 5,838,968 A | * | 11/1998 | Culbert ....................... | 709/104 |

(Continued)

FOREIGN PATENT DOCUMENTS

JP 62065137 A * 3/1987

OTHER PUBLICATIONS

Benni, Luca et al. "Monitoring System Activity for OS-Directed Dynamic Power Management." ACM. 1998.*

*Primary Examiner*—Van H Nguyen
(74) *Attorney, Agent, or Firm*—David A. Dagg

(57) ABSTRACT

A technique for expediting an operation in a computer system involves raising the priority level of an operating system task from a low priority level to a high priority level in order to perform the operation at the high priority level and lowering the priority level of the operating system task back to the low priority level upon completion of the operation. Task priority control logic causes the operating system task to execute at the low priority level as a default priority level. The task priority control logic monitors for a trigger condition indicating that the operation is to be performed. Upon detecting the trigger condition, the task priority control logic raises the operating system task to the high priority level, and begins monitoring for completion of the operation. Upon determining that the operation is complete, the task priority control logic lower the operating system task back to the low priority level.

9 Claims, 3 Drawing Sheets

U.S. PATENT DOCUMENTS

| | | | |
|---|---|---|---|
| 5,925,114 A * | 7/1999 | Hoang | 710/48 |
| 5,944,831 A * | 8/1999 | Pate et al. | 713/324 |
| 5,956,644 A * | 9/1999 | Miller et al. | 455/453 |
| 6,006,264 A * | 12/1999 | Colby et al. | 709/226 |
| 6,016,306 A * | 1/2000 | Le Boudec et al. | 370/235 |
| 6,035,321 A * | 3/2000 | Mays | 718/103 |
| 6,115,751 A * | 9/2000 | Tam et al. | 709/240 |
| 6,148,000 A * | 11/2000 | Feldman et al. | 370/397 |
| 6,148,322 A * | 11/2000 | Sand et al. | 718/103 |
| 6,188,670 B1 * | 2/2001 | Lackman et al. | 370/231 |
| 6,205,508 B1 * | 3/2001 | Bailey et al. | 710/260 |
| 6,209,041 B1 * | 3/2001 | Shaw et al. | 709/321 |
| 6,215,764 B1 * | 4/2001 | Wey et al. | 370/216 |
| 6,230,303 B1 * | 5/2001 | Dave | 716/7 |
| 6,308,245 B1 * | 10/2001 | Johnson et al. | 711/159 |
| 6,430,593 B1 * | 8/2002 | Lindsley | 718/103 |
| 6,430,594 B1 * | 8/2002 | Akiyama et al. | 718/108 |
| 6,430,640 B1 * | 8/2002 | Lim | 710/200 |
| 6,625,124 B1 * | 9/2003 | Fan et al. | 370/235 |
| 6,681,270 B1 * | 1/2004 | Agarwala et al. | 710/40 |
| 6,697,325 B1 * | 2/2004 | Cain | 370/217 |
| 6,769,019 B2 * | 7/2004 | Ferguson | 709/219 |
| 2003/0021228 A1 * | 1/2003 | Nakano et al. | 370/229 |
| 2003/0058804 A1 * | 3/2003 | Saleh et al. | 370/254 |

* cited by examiner

EXPEDITING AN OPERATION IN A COMPUTER SYSTEM

FIELD OF THE INVENTION

The present invention relates generally to computer systems, and more particularly to expediting an operation in a computer system.

BACKGROUND OF THE INVENTION

In today's information age, communication networks are often used for interconnecting computers and computer peripherals. A communication network typically includes a number of nodes that interoperate to route protocol messages. The various nodes in the communication network utilize various routing protocols in order to determine the routes that are used to route the protocol messages. Thus, each node is a computer that performs, among other things, various routing protocols in order to route protocol messages.

One type of routing protocol, known as a "link state" routing protocol, determines routes based upon the status of communication links between the various nodes. A link state routing protocol, such as OSPF and IS-IS, requires each node to have complete topology information. Therefore, each node periodically tests the communication links to each of its neighbors and sends a link state advertisement (LSA) protocol message including the link status information to all of the other nodes. Each node computes the routes based upon the link status information received from the other nodes.

When a node receives a LSA protocol message, the node updates its topology information database to include the link status information received in the LSA protocol message, and runs a special algorithm to determine the routes based upon the updated topology information. One well-known algorithm for determining routes is the Dijkstra shortest path algorithm. The Dijkstra shortest path algorithm computes the shortest paths to all destinations from a single source.

In order for the nodes in the communication network to properly route protocol messages, it is important for each node to compute routes in a timely manner. Unfortunately, the Dijkstra shortest path algorithm is computationally intensive, and can take a relatively long time to complete, especially in communication networks having many nodes.

Thus, a technique for reducing the amount of time required to complete the Dijkstra shortest path computation is needed.

SUMMARY OF THE INVENTION

In accordance with one aspect of the invention, logic for performing an operation is included in an operating system task. The operating system task typically executes at a low priority level. However, when the operation needs to be performed, the operating system task is raised to a high priority level, and the operation is performed at the high priority level. In this way, the operation is not interrupted by other operating system tasks that execute below the high priority level.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
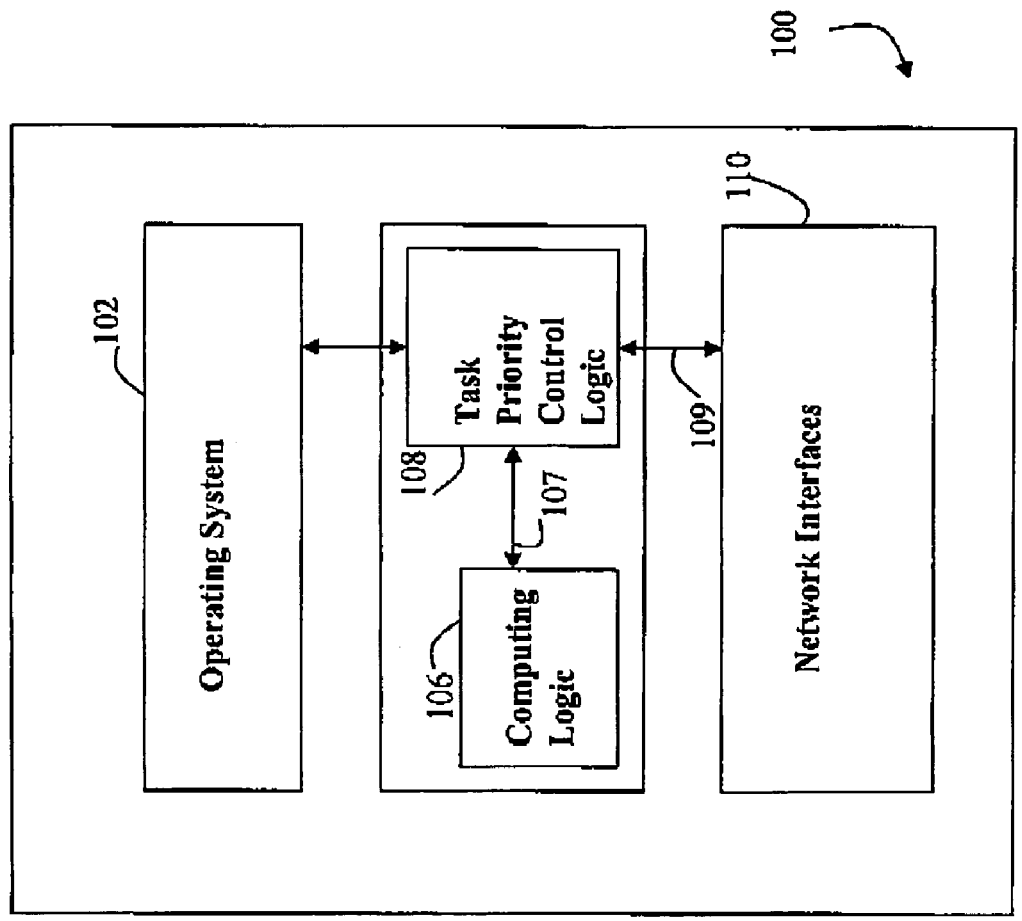
FIG. 1 is a block diagram showing the relevant components of an exemplary node in accordance with an embodiment of the invention.

In an embodiment of the invention, each node includes an operating system that executes various operating system tasks. The logic for performing the Dijkstra shortest path computation is a component of one particular operating system task that is referred to hereinafter as the "routing task." The routing task implements a link state routing protocol, which involves performing the Dijkstra shortest path computation.

In a typical prior art embodiment, the routing task is executed at a predetermined priority level of the operating system. For convenience, this predetermined priority level is referred to hereinafter as the "low priority level," and an operating system task that operates at the low priority level is referred to hereinafter as a "low priority operating system task." Other operating system tasks operate at the low priority level, and the operating system performs multitasking in order to allow the various low priority operating system tasks, including the routing task, to share processing resources. This multitasking typically allows a low priority operating system task to execute for a predetermined period of time (or less, if the task relinquishes control), after which the operating system performs a context switch to allow another low priority operating system task to execute. Thus, a low priority operating system task, such as the routing task, may be interrupted by the operating system in order to allow another low priority operating system task to execute. Furthermore, a low priority operating system task, such as the routing task, may be interrupted by the operating system in order to allow a higher priority operating system task to execute.

Because the Dijkstra shortest path computation is computationally intensive, the Dijkstra shortest path computation can take a relatively long time to complete, especially if the communication network includes many nodes. Inevitably, the routing task is interrupted (perhaps multiple times) during the Dijkstra shortest path computation. This, in turn, increases the amount of time required to complete the Dijkstra shortest path computation.

Therefore, an embodiment of the present invention raises the routing task to a high priority level in order to perform the Dijkstra shortest path computation, and lowers the routing task back to the low priority level upon completion of the Dijkstra shortest path computation. In this way, the routing task is able to execute without being interrupted by the remaining low priority operating system tasks or other operating system tasks running at a lower priority level than the routing task. This, in turn, enables the routing task to complete the Dijkstra shortest path computation with fewer interruptions, thereby reducing the amount of time required to complete the Dijkstra shortest path computation.

In an embodiment of the present invention, the node includes task priority control logic that controls the priority level of the routing task. The task priority control logic may be a component of the routing task or may be distinct from the routing task. The task priority control logic causes the routing task to execute at the low priority level when the routing task is not performing the Dijkstra shortest path computation and at the high priority level when the routing task is performing the Dijkstra shortest path computation.

More specifically, the task priority control logic causes the routing task to execute at the low priority level as the default priority level for the routing task. The task priority control logic monitors for a condition that triggers the Dijkstra shortest path computation, which, in a preferred embodiment, is the receipt of a LSA protocol message including link status information. Upon detecting the trigger condition, the task priority control logic raises the routing task to the high priority level so that the routing task performs the Dijkstra shortest path computation at the high priority level. Upon completion of the Dijkstra shortest path computation, the task priority control logic lowers the routing task back to the low priority level, and monitors for a subsequent trigger condition.

FIG. 1 is a block diagram showing the relevant components of an exemplary node 100 in accordance with an embodiment of the invention. The node 100 includes, among other things, an operating system 102, a task 104, and a number of network interfaces 110. The task 104 includes, among other things, computation logic 106. The task 104 is associated with task priority control logic 108, which may or may not be an actual component of the task 104. The operating system 102 supports at least a high priority level and a low priority level. The task priority control logic 108 causes the task 104 to operate at the low priority level as the default priority level for the task 104. The task priority control logic 108 raises the task 104 to the high priority level upon detecting a trigger condition in order for the computation logic 106 to perform a computation at the high priority level, and lowers the task 104 back to the low priority level when the computation logic 106 has completed the computation.

In a preferred embodiment of the invention, the task 104 is a routing task that executes a link state routing protocol. The computation logic 106 performs a Dijkstra shortest path computation. The trigger condition is the receipt of a LSA protocol message from one of the number of network interfaces 110. The task priority control logic 108 is coupled to the network interfaces 110 via the interface 109 for detecting the trigger condition. The task priority control logic 108 is coupled to the computation logic 106 via the interface 107 to determine when the computation logic 106 has completed the computation. The task priority control logic 108 is coupled to the operating system 102 via the interface 103 to set the priority level for the task 104.

Figure 2:
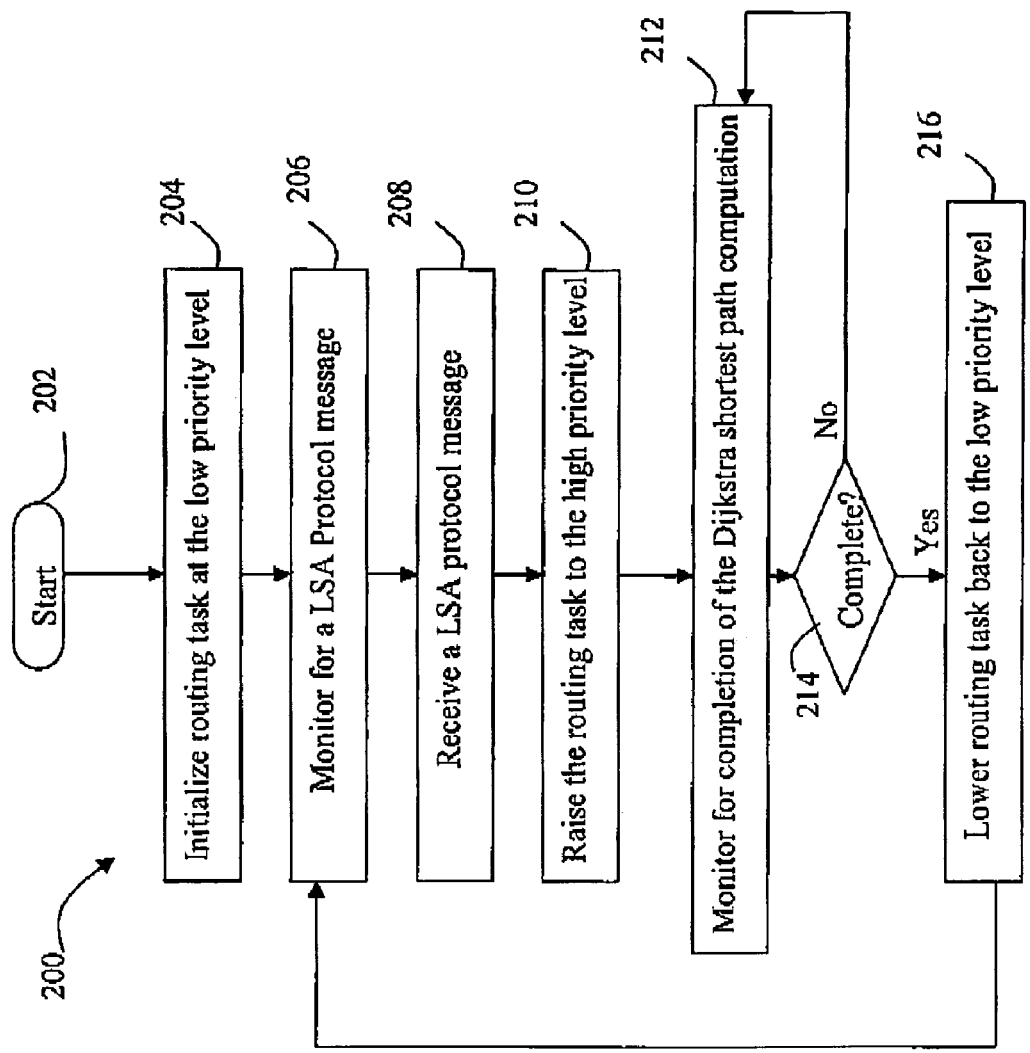
FIG. 2 is a logic flow diagram showing exemplary task priority control logic for expediting the Dijkstra shortest path computation in accordance with an embodiment of the invention.

FIG. 2 is a logic flow diagram showing exemplary task priority control logic 200 for expediting the Dijkstra shortest path computation in accordance with an embodiment of the invention. Beginning at step 202, the logic initializes the routing task at the low priority level, in step 204, and begins monitoring for a LSA protocol message, in step 206. Upon receiving a LSA protocol message, in step 208, the logic raises the routing task to the high priority level, in step 210, and begins monitoring for completion of the Dijkstra shortest path computation, in step 212. The logic continues monitoring for completion of the Dijkstra shortest path computation, in step 212, while the Dijkstra shortest path computation is being performed (NO in step 214). When the Dijkstra shortest path computation is complete (YES in step 214), the logic lowers the routing task back to the low priority level, in step 216, and recycles to step 206 to monitor for a next LSA protocol message.

Although the task priority control logic is preferably used to raise the priority level of the routing task in order to perform the Dijkstra shortest path computation at the high priority level, the task priority control logic can be used more generally to raise the priority level of any task that performs an important operation in order to perform that operation at the high priority level.

Figure 3:
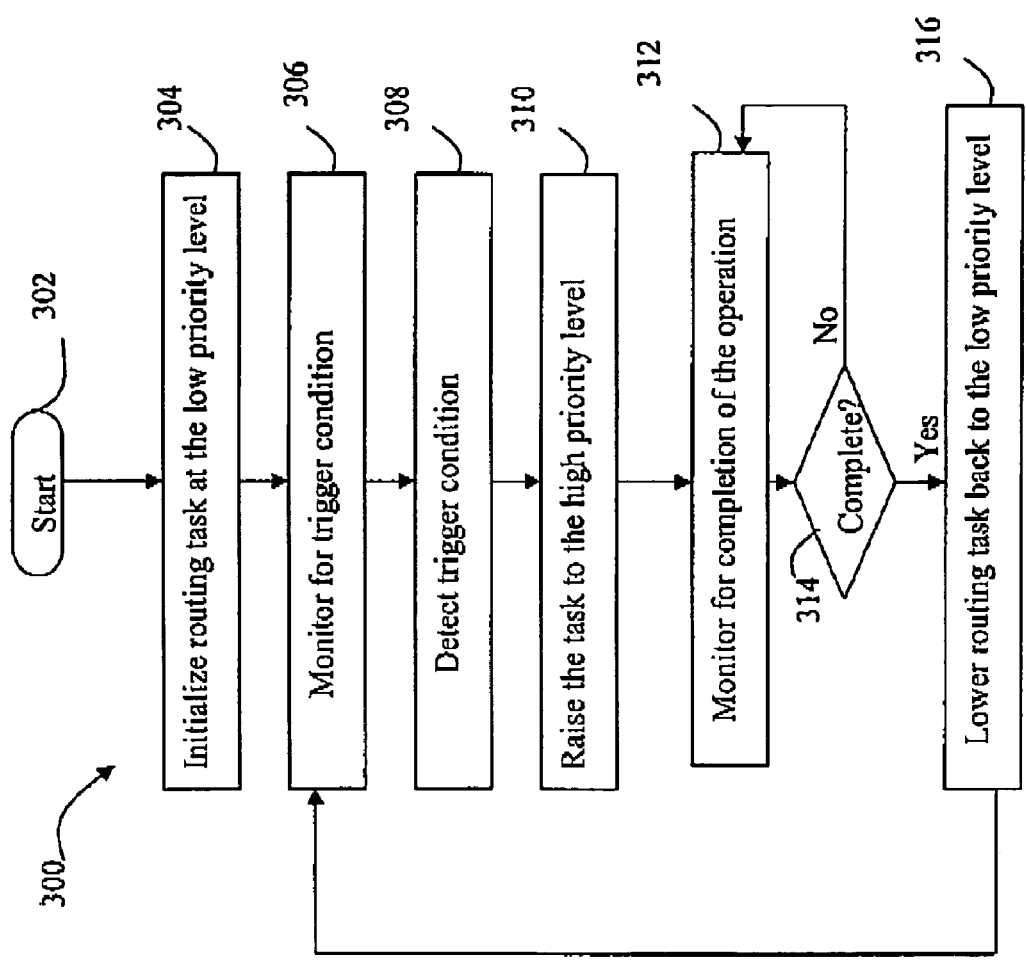
FIG. 3 is a logic flow diagram showing exemplary task priority control logic for expediting a computation in accordance with an embodiment of the invention.

FIG. 3 is a logic flow diagram showing exemplary task priority control logic 300 for expediting an operation in accordance with an embodiment of the invention. Beginning at step 302, the logic initializes the task at the low priority level, in step 304, and begins monitoring for the trigger condition, in step 306. Upon detecting the trigger condition, in step 308, the logic raises the task to the high priority level, in step 310, and begins monitoring for completion of operation, in step 312. The logic continues monitoring for completion of the operation, in step 312, while the operation is being performed (NO in step 314). When the operation is complete (YES in step 314), the logic lowers the task back to the low priority level, in step 316, and recycles to step 306 to monitor for a next trigger condition.

It should be noted that the present invention is in no way limited to the location of the task priority control logic 108 within the node 100. The task priority control logic 108 may be a component of the task 104, the network interfaces 110, a protocol stack (not shown) that processes protocol messages received over the network interfaces 110, or other component of the node 100.

In a preferred embodiment of the present invention, predominantly all of the task priority control logic is implemented as a set of computer program instructions that are stored in a computer readable medium and executed by an embedded microprocessor system within a node. Various embodiments of the invention may be implemented in any conventional computer programming language. For example, an embodiment may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

I claim:

1. A computer implemented method for expediting a selected operation in a computer system, the method comprising:

associating a plurality of routing operations with an operating system routing task, the plurality of routing operations including the selected operation, wherein the operating system routing task is one of a plurality of operating system tasks executed by an operating system included in the computer system;

executing the operating system routing task at a low priority level prior to performing the selected operation;

raising the operating system routing task to a high priority level in order to perform the selected operation in response to a detection of a trigger condition comprising a link state advertisement protocol message indicating that the selected operation is to be performed, wherein the raising the operating system routing task to the high priority level causes the operating system routing task to execute without being interrupted by at least one other operating system task running at the low priority; and lowering the operating system routing task back to the low priority level upon completion of the selected operation.

2. The computer implemented method of claim 1, wherein the link state advertisement protocol message includes link status information.

3. The computer implemented method of claim 2, wherein the selected operation is a Dijkstra shortest path computation utilizing the link status information received in the link state advertisement protocol message.

4. A computer device comprising:

a memory;

an operating system stored on the memory, the operating system comprising:

an operating system routing task including logic which when executed performs a plurality of routing operations, the plurality of routing operations including a selected operation, wherein the operating system routing task is one of a plurality of operating system tasks executed by the operating system included in the computer device;

the operating system including task priority control logic operably coupled to execute the operating system routing task at a low priority level prior to performing the selected operation and raise the operating system routing task to a high priority level in order to perform the selected operation upon detection of a trigger condition, the trigger condition comprising receipt of a link state advertisement protocol message, wherein the raising the operating system routing task to the high priority level causes the operating system routing task to execute without being interrupted by at least one other operating system task running at the low priority, and wherein the task priority control logic is operably coupled to lower the operating system routing task back to the low priority level upon completion of the selected operation.

5. The computer device of claim 4, wherein the link state advertisement protocol message includes link status information.

6. The computer device of claim 5, wherein the selected operation is a Dijkstra shortest path computation utilizing the link status information received in the link state advertisement protocol message.

7. A program product comprising a memory having embodied therein a computer program for expediting a selected operation in a computer system, the computer program comprising:

task priority control logic programmed to execute an operating system routing task associated with a plurality of operations including the selected operation at a low priority level prior to performing the selected operation and raise the operating system routing task to a high priority level in order to perform the selected operation upon detection of a trigger condition including receipt of a link state advertisement protocol message, wherein the operating system routing task is one of a plurality of operating system tasks executed by an operating system included in the computer system, and wherein the raising the operating system routing task to the high priority level causes the operating system routing task to execute without being interrupted by at least one other of the plurality of operating system tasks running at the low priority, and wherein the task priority control logic is programmed to lower the operating system task back to the low priority level upon completion of the selected operation.

8. The program product of claim 7, wherein the link state advertisement protocol message includes link status information.

9. The program product of claim 8, wherein the selected operation is a Dijkstra shortest path computation utilizing the link status information received in the link state advertisement protocol message.

* * * * *